O. VAN DER MEERSCH.
MIXING MACHINE.
APPLICATION FILED NOV. 21, 1911.
1,037,810.
Patented Sept. 3, 1912.
2 SHEETS—SHEET 1.
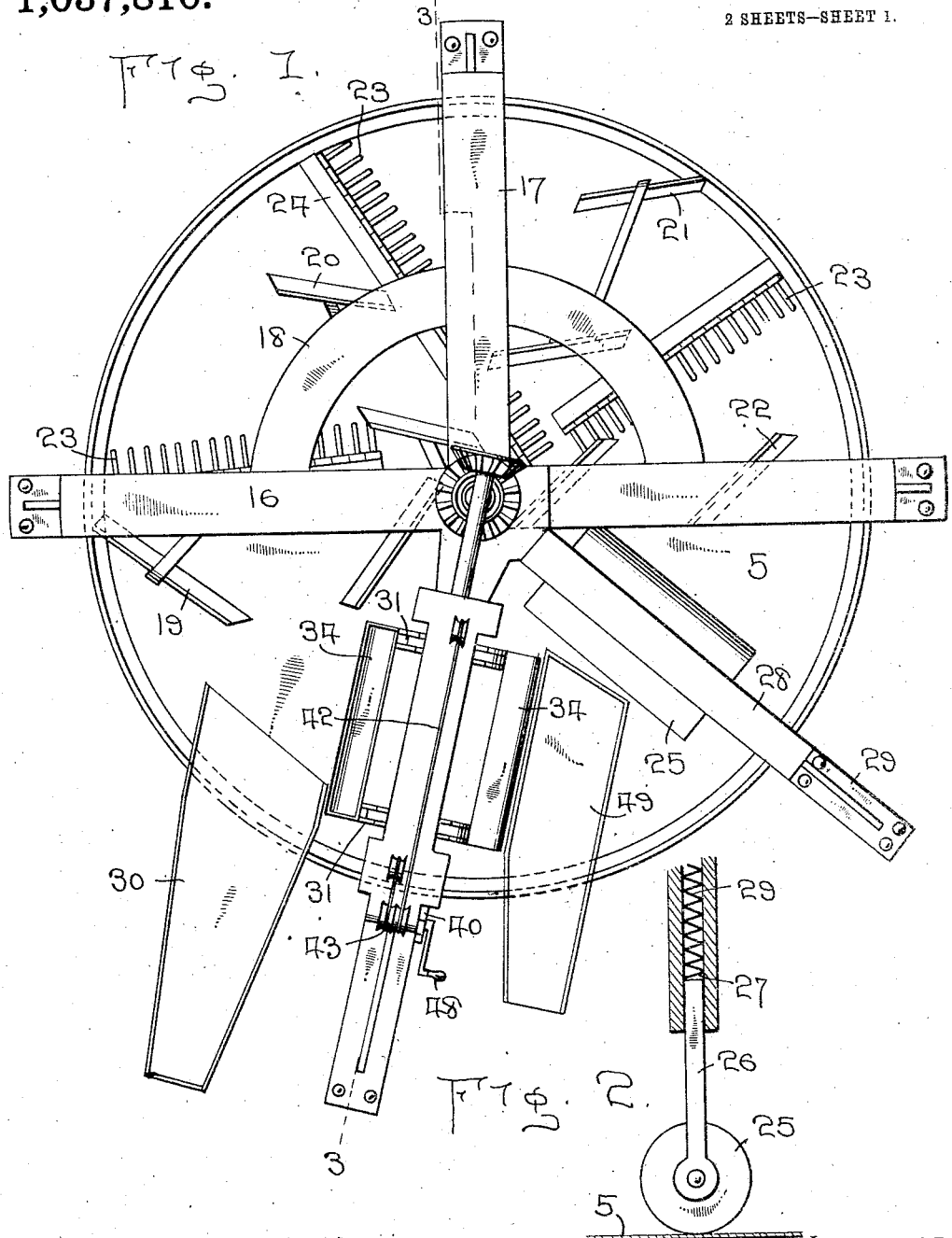
WITNESSES:
Thos. W. Riley
M. Newcomb
INVENTOR
Oscar Van der Meersch
BY W. T. Fitz Gerald & Co.
Attorneys

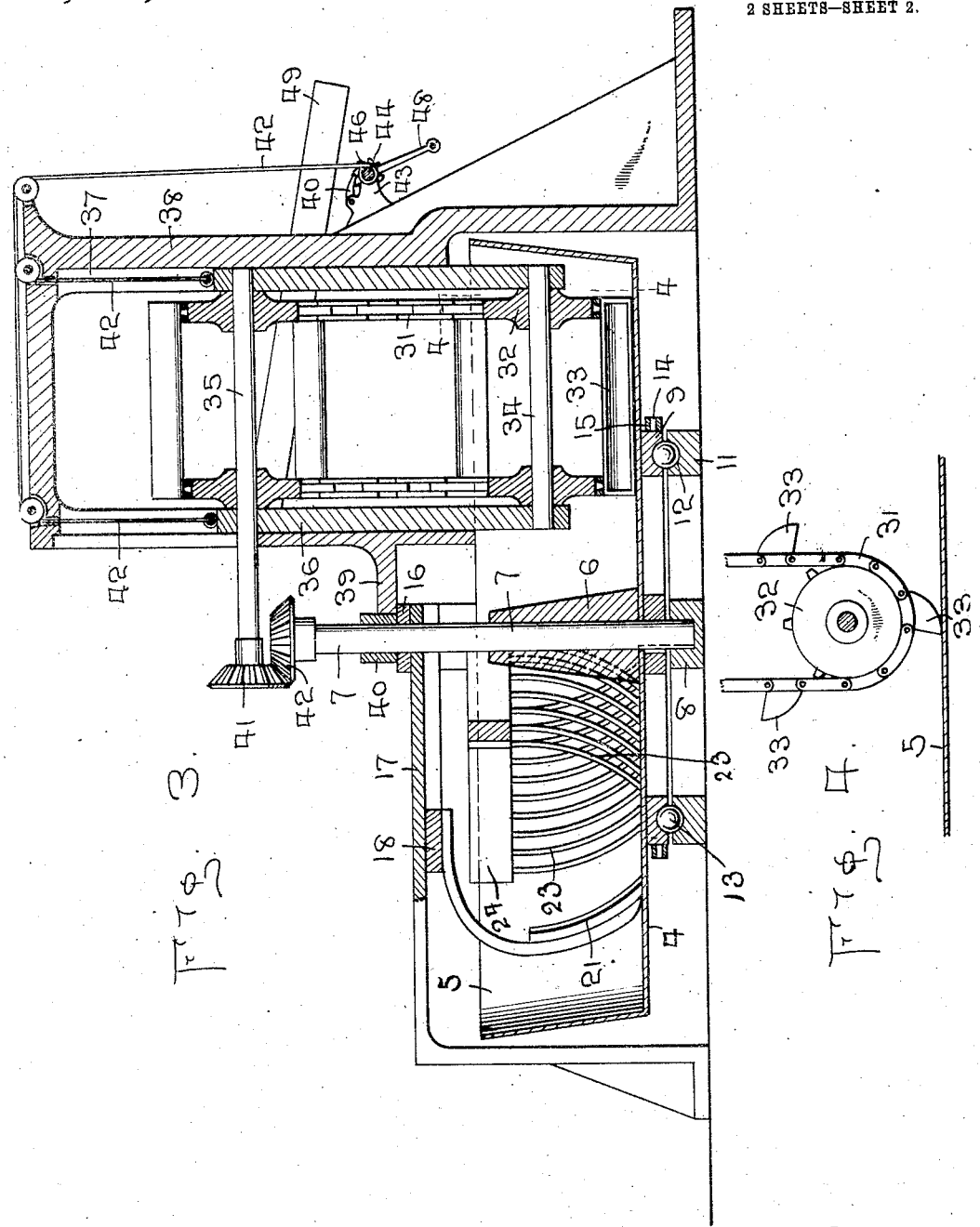

UNITED STATES PATENT OFFICE.

OSCAR VAN der MEERSCH, OF RICHMOND, VIRGINIA.

MIXING-MACHINE.

1,037,810.  Specification of Letters Patent.  Patented Sept. 3, 1912.

Application filed November 21, 1911. Serial No. 661,554.

*To all whom it may concern:*

Be it known that I, OSCAR VAN DER MEERSCH, a citizen of the United States, residing at Richmond, in the county of Henrico and State of Virginia, have invented certain new and useful Improvements in Mixing-Machines; and I do hereby declare the following to be a full, clear, and exact description of the invention, such as will enable others skilled in the art to which it appertains to make and use the same.

My invention relates to new and useful improvements in mixing machines and more particularly to a device adapted to be used for mixing and delivering mortar or similar substances.

The object of my invention is to provide a device whereby the ingredients of mortar may be thoroughly intermixed and readily removed from the device when desired.

Other objects and advantages of my invention will be made clearly apparent in the specification and pointed out in the claims.

In the accompanying drawings I have shown the preferred form which my invention may take.

In said drawings, Figure 1 is a top plan view of my complete invention. Fig. 2 is a detail sectional view of a portion of the breaking roller employed in connection with my mixing device. Fig. 3 is a vertical sectional view as seen on line 3—3, Fig. 1, and, Fig. 4 is a detail view, showing the lower portion of the endless conveyer employed by me in removing the contents from the mixing drum of my device.

In referring to the drawings I have employed numerals of reference to designate the several parts of the invention, the same numerals being applied to corresponding parts throughout the several views.

The rotating member or mixing bowl of my mortar mixer comprises a floor section 4, an upwardly extending rim 5 at the outer edge thereof and an upwardly extending central or hub portion 6, the wall of said hub portion being preferably substantially conical. A shaft 7 extends through the hub portion and is secured thereto, said shaft projecting above and below the rotating member. The lower end of said shaft is seated in a bearing block 8, which is secured to a suitable foundation. A trackway 9 is secured to the lower surface of the floor 5 and has a channel 10 therein. A similar trackway 11 is secured to the foundation and has a similar channel 12 therein, bearing balls 13 being positioned in the channels 10 and 12. The trackway 9 is also provided upon its outer surface with a plurality of teeth 14, which are adapted to be engaged by a chain 15, by means of which the mixing bowl is rotated.

The stationary portions of my mortar mixer are adapted to be secured to a supporting frame, comprising bars 16 and 17, preferably arranged at right angles to each other. The bar 16 being apertured at its center and the bar 17 at its inner end to receive and form bearings for the upper end of the shaft 7. The outer ends of the bars 16 and 17 are directed downwardly and outwardly, the ends thereof being secured to the supporting base. An additional bar 18 is preferably arcuately arranged and secured at its central point to the bar 17 and at its ends to the bar 16. Secured to the supporting frame formed by the bars 16, 17 and 18 are plows 19, 20, 21 and 22 arranged in pairs or sets. The plows 19 are secured to the supporting bar 16 and are arranged obliquely toward one another and so that one of said plows bears against the floor and against the rim 5, the other plow bearing against the floor and the center of the rotating member. The plows 20, 21 and 22 are secured to the supporting bars 18 and 16 and are directed obliquely away from one another. The plows 20 and 22 are similarly arranged and one of each of said plows bears against the floor 4 and center 6 so as to turn the material being mixed away from said center, the other one of each of said plows and one of the plows 21 being disposed substantially equidistant from said center and the rim of the mixing bowl. The other one of the plows 21 bears against the floor and the rim to turn the material away from the rim.

Interposed between the plows 19, 20, 21 and 22 are spreading devices 23, which are preferably in the form of rakes. Each spreading device consists of a plurality of teeth, which are preferably downwardly and forwardly directed, the upper ends of said teeth being secured to bars 24, which in turn are secured to the bars 16 and 18. While I have shown the spreading device consisting of a plurality of bars with teeth attached thereto, I desire it to be understood that the spreading bar and teeth may be formed integrally, if desired.

In order that any lumps in the material to be mixed may be crushed, I provide a roller 25 adapted to bear against the floor 4. The supporting arms 26 for the roller are vertically movable in ways 27 formed in an inverted U-shaped supporting frame 28, suitable springs 29 being positioned in said ways to normally hold the roller into engagement with the floor 4. The frame 28 is provided with a supporting base 29, by means of which the same may be rigidly secured to the foundation.

When it is desired to mix mortar, the ingredients thereof such as sand, cement, etc., are directed upon a downwardly inclined trough 30, from which the same will slide by gravity into the mixing bowl. The mixing bowl being rapidly rotated will carry the material under the roller 25, which will crush all lumps therein. The set of plows 22 will spread the material in two furrows on the floor between the center and rim of the mixing bowl, the rake 23 will then engage the furrows of material and turn the same over and also spread said material over the floor of the mixing bowl. The second set of plows 21 will then engage the material, directing the same into two furrows, one plow turning the material over in a furrow against the center and the other scraping the material from the rim and directing it in a furrow between said plows. The furrows of material are then spread and mixed by the succeeding rake, after which the same is directed into two furrows over the floor of the bowl and over and against the rim of the mixing bowl by the plows 20. The material is then again spread and mixed by the succeeding rake and then directed into a single furrow by the plows 19. With the arrangement of plows here described, it will be seen that the material will be turned over or spread seven times during one revolution of the mixing bowl.

In order that the material after being mixed may be readily removed from the mixing bowl, I provide an endless conveyer, which may be lowered into the path of the material when desired. The endless conveyer consists of chains 31 mounted upon sprockets 32, the chains 31 carrying a plurality of buckets 33. The sprockets 32 are mounted in pairs upon shafts 34 and 35 arranged at the lower and upper ends of a movable frame 36. The movable frame 36 is vertically movable in guideways 37 formed in the stationary frame 38. The frame 38 is secured at one side to the foundation and has an arm 39 at its other side, said arm terminating in a sleeve 40 adapted to receive the upper end of the shaft 7. The shaft 35 is extended to the center of the mixing drum and is provided on said extended end with a bevel gear 41 adapted, when the conveyer is in its lowest position, to mesh with a bevel gear 42, rigidly secured to the upper end of the shaft 7.

When material is being mixed, it is desirable to hold the conveyer out of the path of said material and with this object in view, I secure one end of cables 42 to the upper ends of the auxiliary frame, said cables passing over suitable guide rollers and the other ends thereof being secured to drums 43 of a suitable windlass. The drums 43 are secured to a shaft 44 journaled in brackets 45 extending from the frame 38. Also rigidly secured to the shaft 44 is a ratchet wheel 46 and a dog 47 pivoted to the bracket 45 is adapted to engage said ratchet wheel and prevent rotation thereof in one direction. A suitable crank 48 is secured to the shaft 44 so that, when desired, the auxiliary frame may be elevated.

When the material has been thoroughly mixed, as heretofore described, and it is desired to remove the same from the mixing bowl, the dog 47 is disengaged from the ratchet wheel and the crank rotated to lower the auxiliary frame until the buckets 33 will engage the floor 4 of the mixing bowl. When this position is reached, the gear 41 will mesh with the rotating gear 42 and the conveyer will be operated. The material in the mixing bowl will be caught in the buckets 33 and carried upwardly and will be discharged therefrom into a suitable trough 49, which is outwardly and downwardly inclined so that the material will slide therefrom by gravity. The outer end of the trough may be directed into any suitable receptacle whereby the material may be carried to the place where the same is to be used.

From the foregoing description it will be seen that I have provided a device for mixing mortar, which will readily and quickly perform the purpose for which it is designed. It will also be seen that I have provided means for easily and readily removing the mixed material from the rotating bowl, when desired, and which will be normally out of the path of the material being mixed.

While I have described my invention as being particularly adapted for use in mixing mortar, I desire it to be understood that I may employ the same to mix concrete, plaster, or other similar material.

While I have described and shown the preferred form of my invention, I desire it to be understood that I may make modifications therein without departing from the spirit and scope thereof.

What I claim as new is:

1. In a mixing device the combination with a rotating bowl and mixing devices associated with said bowl; of means to remove material from said bowl comprising a frame, a conveyer vertically movable in said frame and normally inoperative, means to raise or lower said conveyer, and means carried by said bowl and said conveyer adapted to operate said conveyer when in its lowest position.

2. In a mixing device the combination with a rotating mixing bowl, a shaft secured thereto and extending upwardly therefrom, and a gear secured to said shaft; of means to remove material from said mixing bowl comprising a frame, a conveyer movably mounted in said frame and normally inoperative, means to raise or lower said conveyer, and a gear carried by said conveyer adapted to mesh with the aforementioned gear when said conveyer is in its lowest position whereby said conveyer will be operated.

3. The combination with a rotating mixing bowl, a shaft extending vertically thereof, and a gear secured to said shaft; of means to remove material from said bowl comprising a stationary frame, a conveyer frame movably mounted in said stationary frame, a horizontally extending shaft rotatably mounted in said conveyer frame, a gear carried thereon, an endless conveyer adapted to be operated on said shaft, and means to raise or lower said conveyer frame, said gears adapted to mesh when said conveyer frame is in its lowest position whereby said conveyer will be operated.

4. In a mixing device the combination with a rotating mixing bowl, a shaft secured thereto and extending vertically therefrom, and a gear secured to the upper end of said shaft; of means for removing material from said bowl comprising a frame extending thereover, vertical ways in said frame, a conveyer frame movably mounted in said ways, an operating shaft rotatably mounted in said conveyer frame and extending horizontally therefrom, a gear thereon adapted to mesh with the aforementioned gear when the conveyer frame is in its lowest position, a conveyer mounted on said operating shaft, and means to raise and lower said conveyer frame.

In testimony whereof I have signed my name to this specification in the presence of two subscribing witnesses.

OSCAR VAN DER MEERSCH.

Witnesses:
  Ro. H. GILLIAM,
  W. E. BARKER.